US012691878B2

(12) United States Patent (10) Patent No.: US 12,691,878 B2
Valverde et al. (45) Date of Patent: Jul. 28, 2026

(54) MULTI-VEHICLE ADAPTIVE CRUISE CONTROL AS A CONSTRAINED DISTANCE BOUND

(71) Applicant: TORC Robotics, Inc., Blacksburg, VA (US)

(72) Inventors: Rikki Valverde, Blacksburg, VA (US); Nikhilkumar Bhalodiya, Blacksburg, VA (US); Sheril Avikkal Kunhippurayil, Blacksburg, VA (US)

(73) Assignee: TORC ROBOTICS, INC., Blacksburg, VA (US)

( * ) Notice: Subject to any disclaimer, the term of this patent is extended or adjusted under 35 U.S.C. 154(b) by 400 days.

(21) Appl. No.: 18/311,604

(22) Filed: May 3, 2023

(65) Prior Publication Data

US 2024/0367650 A1 Nov. 7, 2024

(51) Int. Cl.
B60W 30/16 (2020.01)
B60W 60/00 (2020.01)

(52) U.S. Cl.
CPC .......... B60W 30/16 (2013.01); B60W 60/001 (2020.02); *B60W 2554/4041* (2020.02); *B60W 2554/802* (2020.02); *B60W 2554/804* (2020.02); *B60W 2556/45* (2020.02)

(58) Field of Classification Search
None
See application file for complete search history.

(56) References Cited

U.S. PATENT DOCUMENTS

| | | | | |
|---|---|---|---|---|
| 6,032,097 | A * | 2/2000 | Iihoshi | G05D 1/0293 |
| | | | | 340/436 |
| 8,315,775 | B2 * | 11/2012 | Biondo | B60W 30/143 |
| | | | | 701/484 |
| 9,969,393 | B2 * | 5/2018 | Rebhan | B60W 30/16 |
| 11,173,905 | B2 * | 11/2021 | Ito | B60W 30/162 |
| 11,345,345 | B2 * | 5/2022 | Glück | B60W 30/16 |
| 11,590,973 | B2 * | 2/2023 | Kohler | B60W 40/08 |
| 11,620,907 | B2 * | 4/2023 | Vassilovski | B60W 30/18159 |
| | | | | 701/23 |
| 11,667,285 | B2 * | 6/2023 | Wang | B60W 30/16 |
| | | | | 701/93 |
| 12,097,854 | B2 * | 9/2024 | Baek | B60W 30/16 |
| 2006/0100769 | A1 * | 5/2006 | Arai | B60W 30/16 |
| | | | | 701/96 |
| 2009/0164109 | A1 * | 6/2009 | Maruyama | G08G 1/22 |
| | | | | 701/116 |
| 2009/0276135 | A1 * | 11/2009 | Hagemann | B60W 30/16 |
| | | | | 701/96 |
| 2013/0124064 | A1 * | 5/2013 | Nemoto | B60K 31/0058 |
| | | | | 701/1 |

(Continued)

*Primary Examiner* — Jonathan M Dager
(74) *Attorney, Agent, or Firm* — Armstrong Teasdale LLP

(57) ABSTRACT

Systems and methods of determining distance bounds for adaptive cruise control. An autonomous vehicle system can identify a second vehicle on the roadway that is traveling in front of the autonomous vehicle; determine a speed of the second vehicle while the second vehicle travels along the roadway; generate a distance bound between the autonomous vehicle and the second vehicle based on the speed of the second vehicle and a speed of the autonomous vehicle; and control the speed of the autonomous vehicle to implement adaptive cruise control according to the distance bound.

20 Claims, 7 Drawing Sheets

(56)     References Cited

U.S. PATENT DOCUMENTS

| | | | | |
|---|---|---|---|---|
| 2015/0344033 | A1* | 12/2015 | Fukuda | B60W 30/18163 |
| | | | | 701/117 |
| 2016/0121890 | A1* | 5/2016 | Han | B60W 30/16 |
| | | | | 701/93 |
| 2016/0304092 | A1* | 10/2016 | Rebhan | B60W 30/16 |
| 2017/0355368 | A1* | 12/2017 | O'Dea | B60W 30/14 |
| 2018/0050697 | A1* | 2/2018 | Kuszmaul | B60W 30/165 |
| 2018/0210462 | A1* | 7/2018 | Switkes | G05D 1/0217 |
| 2019/0071084 | A1* | 3/2019 | Tuncali | B60W 30/16 |
| 2019/0391582 | A1* | 12/2019 | Jung | B60W 30/16 |
| 2020/0201356 | A1* | 6/2020 | Schuh | B60W 30/165 |
| 2020/0239015 | A1* | 7/2020 | Nishida | B60W 30/08 |
| 2020/0276972 | A1* | 9/2020 | Ito | B60W 30/18072 |
| 2020/0324765 | A1* | 10/2020 | Lanfranco | B60W 40/06 |
| 2020/0377102 | A1* | 12/2020 | Kuwahara | B60W 40/04 |
| 2020/0377112 | A1* | 12/2020 | Karlsson | B60K 35/22 |
| 2021/0094542 | A1* | 4/2021 | Horiguchi | B60T 7/042 |
| 2021/0155234 | A1* | 5/2021 | Kohler | B60W 30/14 |
| 2021/0171030 | A1* | 6/2021 | Lee | H04W 4/40 |
| 2021/0197860 | A1* | 7/2021 | Kwon | B60W 10/18 |
| 2021/0331676 | A1* | 10/2021 | Wu | B60W 30/143 |
| 2022/0250621 | A1* | 8/2022 | Iba | B60W 10/18 |
| 2022/0289190 | A1* | 9/2022 | Inoue | G06V 20/584 |
| 2023/0024074 | A1* | 1/2023 | Park | B60W 30/0956 |
| 2023/0031030 | A1* | 2/2023 | Park | B60W 60/001 |
| 2023/0035228 | A1* | 2/2023 | Gupta | G05B 13/0265 |
| 2023/0356716 | A1* | 11/2023 | Park | B60W 30/16 |
| 2024/0416898 | A1* | 12/2024 | Perez Barrera | B60W 60/0015 |
| 2025/0162589 | A1* | 5/2025 | Nardelli | B60W 30/18163 |

* cited by examiner

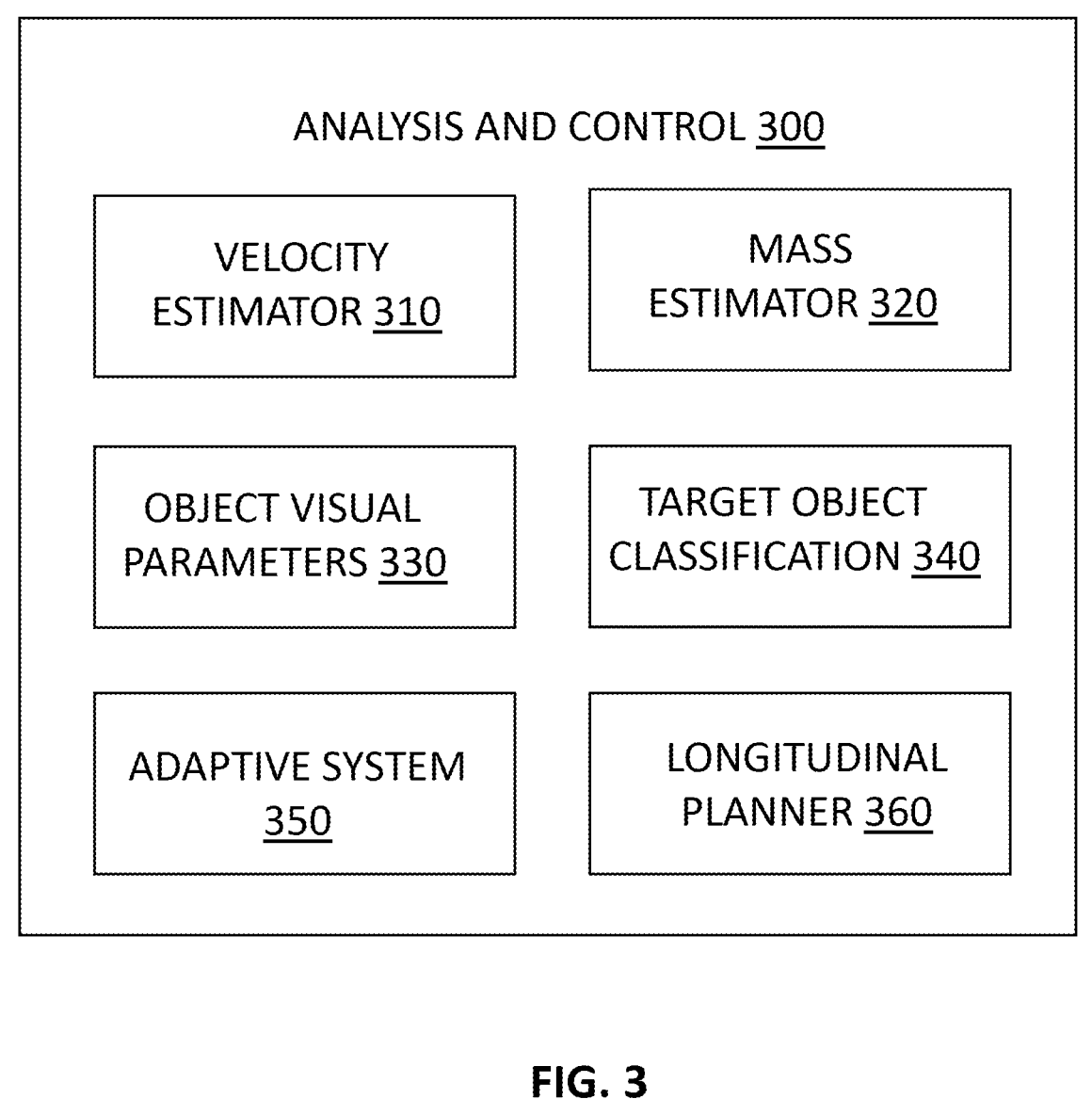

ANALYSIS AND CONTROL 300

VELOCITY ESTIMATOR 310

MASS ESTIMATOR 320

OBJECT VISUAL PARAMETERS 330

TARGET OBJECT CLASSIFICATION 340

ADAPTIVE SYSTEM 350

LONGITUDINAL PLANNER 360

FIG. 3

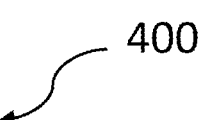

400

```
┌─────────────────────────────────────────────────┐
│  Identify a second vehicle that is traveling     │
│  in front of the autonomous vehicle 410          │
└─────────────────────────────────────────────────┘
                         │
                         ▼
┌─────────────────────────────────────────────────┐
│  Determine a speed of the second vehicle while   │
│  the second vehicle travels along the roadway.   │
│  420                                             │
└─────────────────────────────────────────────────┘
                         │
                         ▼
┌─────────────────────────────────────────────────┐
│  Generate a distance bound between the           │
│  autonomous vehicle and the second vehicle       │
│  based on the speed of the second vehicle and    │
│  a speed of the autonomous vehicle 430           │
└─────────────────────────────────────────────────┘
                         │
                         ▼
┌─────────────────────────────────────────────────┐
│  Control a speed of the autonomous vehicle to    │
│  implement adaptive cruise control according     │
│  to the distance bound 440                       │
└─────────────────────────────────────────────────┘
```

FIG. 4

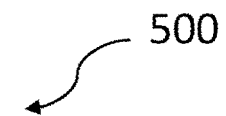
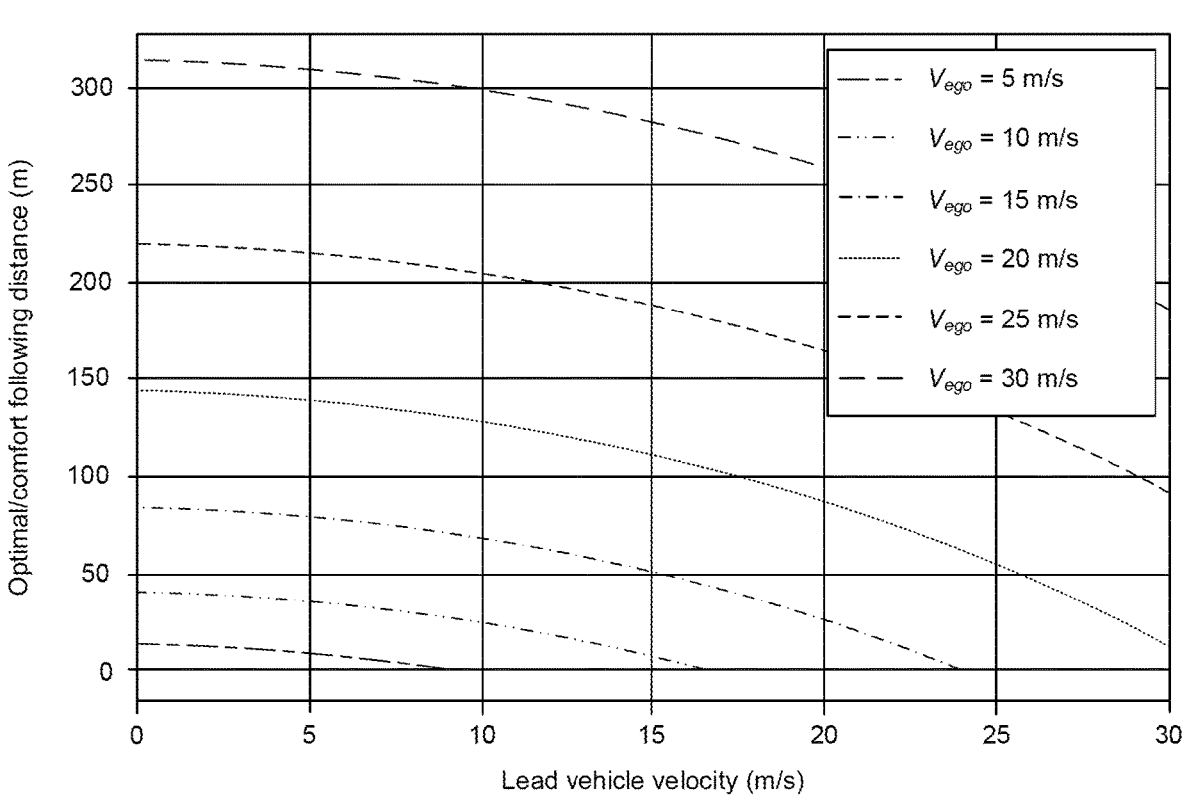
FIG. 5

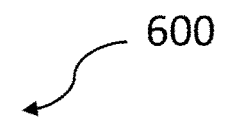
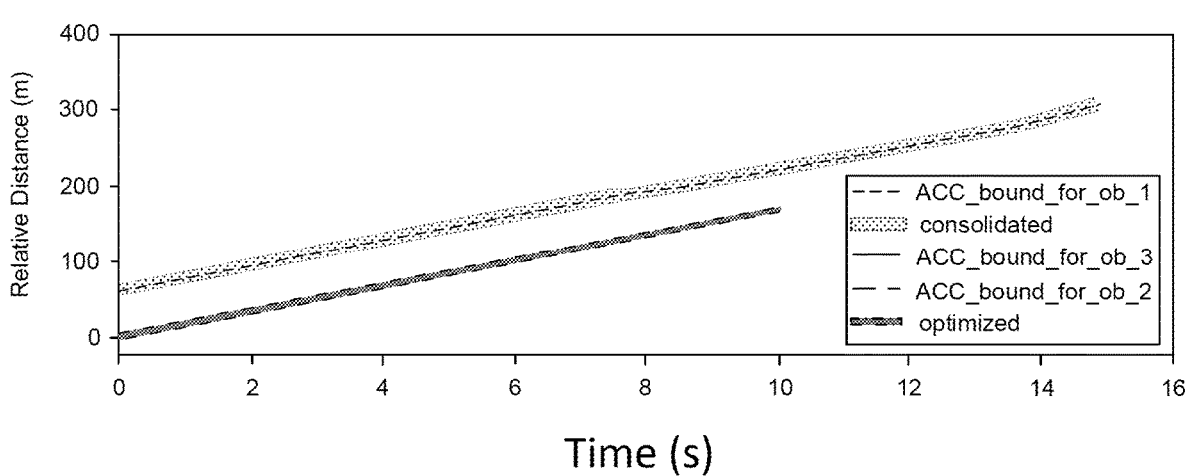
FIG. 6

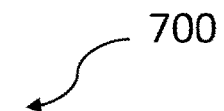
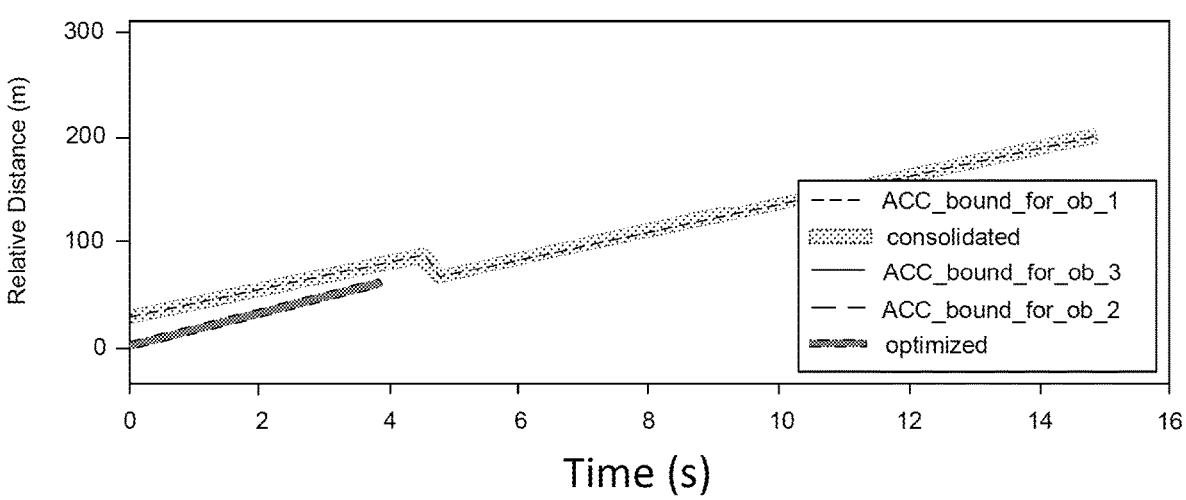
FIG. 7

MULTI-VEHICLE ADAPTIVE CRUISE CONTROL AS A CONSTRAINED DISTANCE BOUND

TECHNICAL FIELD

The present disclosure relates generally to autonomous vehicles and, more specifically, to adaptive cruise control implemented as a constrained distance bound between multiple vehicles.

BACKGROUND

The use of autonomous vehicles has become increasingly prevalent in recent years, with the potential for numerous benefits. One challenge faced by autonomous vehicles is performing adaptive cruise control in a manner that does not disrupt traffic. Current implementations of adaptive cruise control attempt to achieve a desired headway between a second vehicle and the autonomous vehicle implementing adaptive cruise control. Headway may be defined as the distance between the autonomous vehicle and the second vehicle divided by the speed of the autonomous vehicle. Headway is controlled via a distance regulation policy to achieve a set headway.

However, such approaches to cruise control fail to consider the relative speeds of each vehicle when controlling the autonomous vehicle. This means that if the second vehicle is going much slower than the autonomous vehicle, the necessary distance to avoid a collision is much higher. Utilizing only a predefined headway setpoint fails to consider such circumstances, leading to increased risk of damage to the autonomous vehicle or other vehicles on the roadway when implementing adaptive cruise control.

SUMMARY

The systems and methods of the present disclosure may solve the problems set forth above and/or other problems in the art. The scope of the current disclosure, however, is defined by the attached claims, and not by the ability to solve any specific problem. Disclosed herein are techniques to improve adaptive cruise control through the use of distance bound constraints between multiple vehicles. Rather than implementing a predefined setpoint for headway between a second vehicle and an autonomous vehicle, the systems and methods described herein can implement assumptions for the maximum deceleration expected for the lead vehicle and comfortable deceleration for the autonomous vehicle. Using such parameters, the systems and methods described herein can calculate, in real-time or near real-time, an optimal distance between the autonomous vehicle and the second vehicle based on the relative velocities of each vehicle.

One embodiment of the present disclosure is directed to a system. The system includes at least one processor of an autonomous vehicle traveling on a roadway. The system can identify a second vehicle on the roadway that is traveling in front of the autonomous vehicle; determine a speed of the second vehicle while the second vehicle travels along the roadway; generate a distance bound between the autonomous vehicle and the second vehicle based on the speed of the second vehicle and a speed of the autonomous vehicle; and control the speed of the autonomous vehicle to implement adaptive cruise control according to the distance bound.

The system may execute an object detection model to identify the second vehicle on the roadway. The system may determine the speed of the second vehicle based on sensor data captured by one or more sensors mounted on the autonomous vehicle. The system may dynamically increase the distance bound upon detecting a change in the speed of the second vehicle or the speed of the autonomous vehicle. The system may dynamically adjust the distance bound upon detecting a change in the speed of the second vehicle or the speed of the autonomous vehicle.

The system may determine the distance bound based on a first predicted position of the autonomous vehicle and a second predicted position of the second vehicle. The system may determine a decreased speed for the autonomous vehicle based on the speed of the autonomous vehicle and the speed of the second vehicle. The system may cause the autonomous vehicle to slow to the decreased speed by determining an intermediate distance bound between the autonomous vehicle and the second vehicle.

The second vehicle may be a second autonomous vehicle. The system may transmit a signal to at least one second processor of the second autonomous vehicle to determine a maximum distance bound between the autonomous vehicle and the second autonomous vehicle. The system may determine a consolidated distance bound based on the distance bound and a second distance bound determined based on a third vehicle.

One other embodiment of the present disclosure is directed to a method. The method may be performed by at least one processor of an autonomous vehicle traveling on a roadway, for example. The method includes identifying a second vehicle on the roadway that is traveling in front of the autonomous vehicle; determining a speed of the second vehicle while the second vehicle travels along the roadway; generating a distance bound between the autonomous vehicle and the second vehicle based on the speed of the second vehicle and a speed of the autonomous vehicle; and controlling the speed of the autonomous vehicle to implement adaptive cruise control according to the distance bound.

The method may include executing an object detection model to identify the second vehicle on the roadway. The method may include determining the speed of the second vehicle based on sensor data captured by one or more sensors mounted on the autonomous vehicle. The method may include dynamically increasing the distance bound upon detecting a change in the speed of the second vehicle or the speed of the autonomous vehicle. The method may include dynamically adjusting the distance bound upon detecting a change in the speed of the second vehicle or the speed of the autonomous vehicle.

The method may include determining the distance bound based on a first predicted position of the autonomous vehicle and a second prediction position of the second vehicle. The method may include determining a decreased speed for the autonomous vehicle based on the speed of the autonomous vehicle and the speed of the second vehicle. The method may include causing the autonomous vehicle to slow to the decreased speed by determining an intermediate distance bound between the autonomous vehicle and the second vehicle.

The second vehicle may be a second autonomous vehicle. The method may include transmitting a signal to at least one second processor of the second autonomous vehicle to determine a maximum distance bound between the autonomous vehicle and the second autonomous vehicle. The method may include determining a consolidated distance bound based on the distance bound and a second distance bound determined based on a third vehicle.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

FIG. 3 is a schematic diagram of an analysis and control module of the autonomy system of an autonomous vehicle, according to an embodiment.

FIG. 4 is a flow diagram of an example method of determining distance bounds for adaptive cruise control, according to an embodiment.

FIG. 5 depicts an example graph diagram showing following distances determined for an autonomous vehicle in response to different lead vehicle velocities and autonomous vehicle velocities, according to an embodiment.

FIG. 6 depicts an example graph diagram showing projections of different bounds determined when the autonomous vehicle is at a safe following distance, according to an embodiment.

FIG. 7 depicts an example graph diagram showing projections of different bounds determined when the autonomous vehicle is to slow down to maintain a safe following distance, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
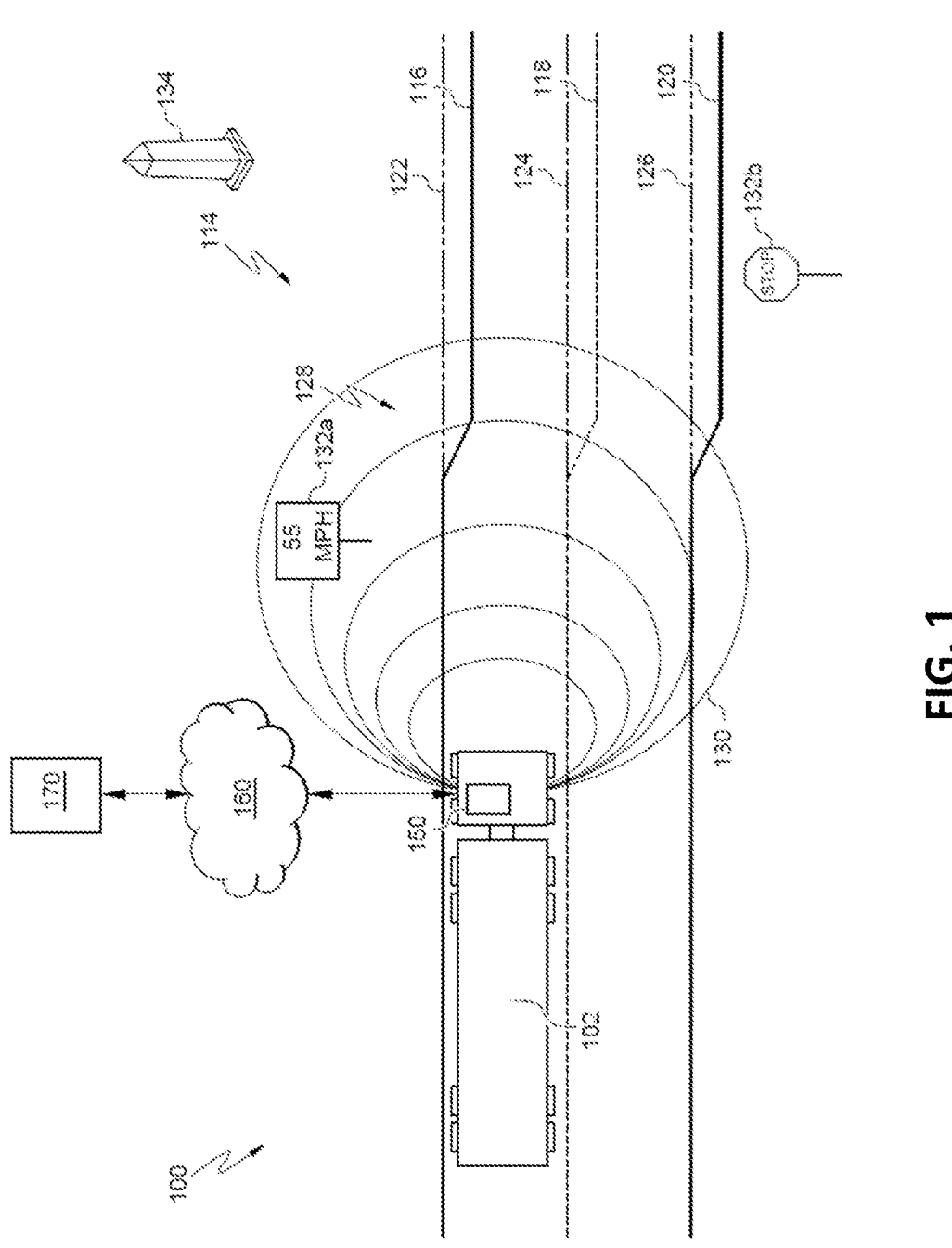
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous vehicles. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102 and distinctly classify the objects in the road.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing.

FIG. 1 further illustrates an environment 100 for modifying one or more actions of the truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous, having varying degrees of autonomy or autonomous functionality.

Figure 2:
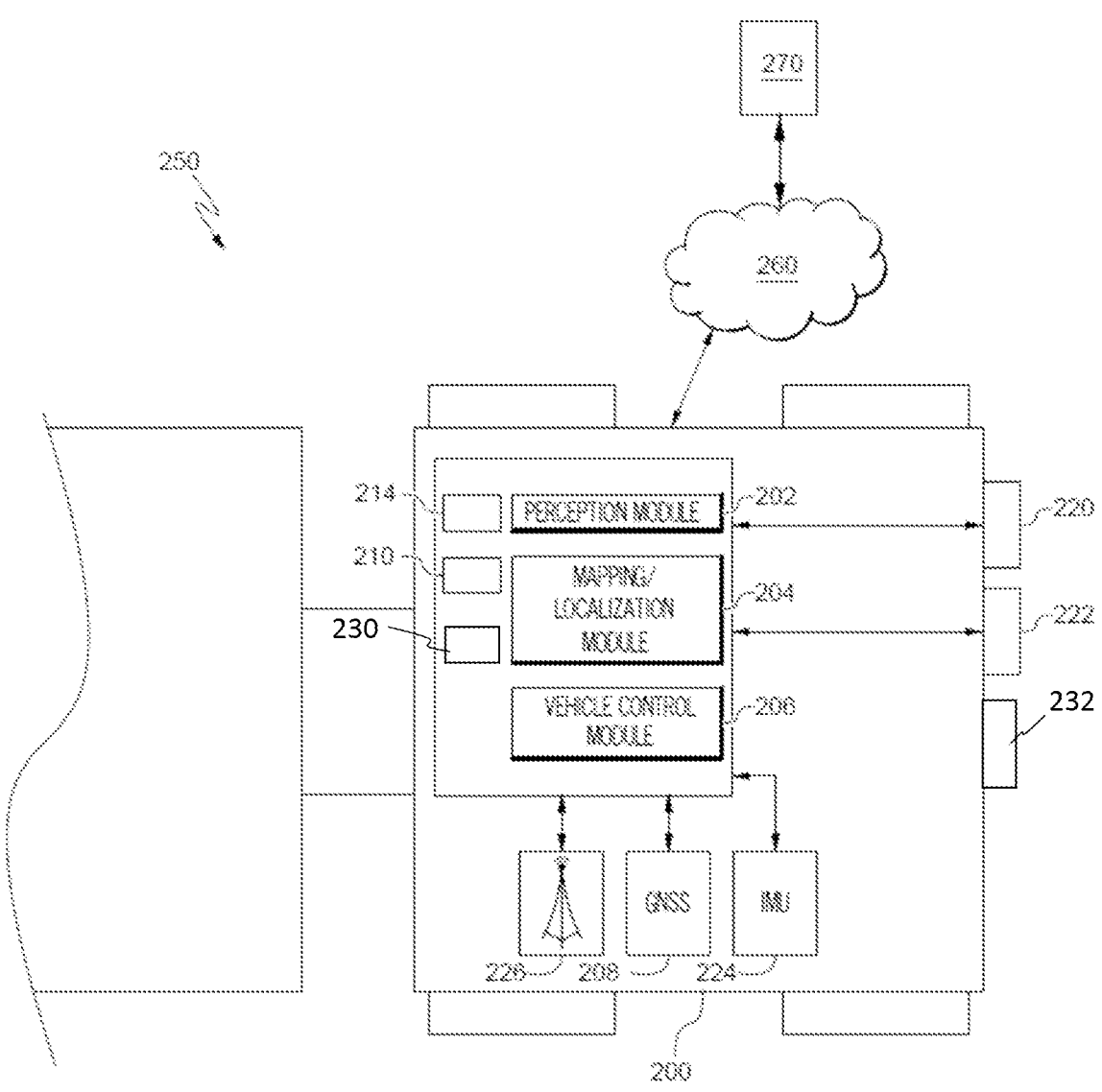
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field of view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side of, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHZ, 77 GHZ, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200 and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.). In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate the truck 200 or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some of or the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck. Various other known circuits may be associated with the autonomy system 250, including signal-conditioning circuitry, communication circuitry, actuation circuitry, and other appropriate circuitry.

The memory 214 of autonomy system 250 may store data and/or software routines that may assist the autonomy system 250 in performing its functions, such as the functions of the perception module 202, the localization module 204, the vehicle control module 206, a road analysis module 230, and the method 400 of FIG. 4. The memory 214 may store information relating to the generation of distance bounds for adaptive cruise control, including the velocity of the truck 200, the velocity of a leading vehicle detected in front of the truck 200, and distance bounds generated according to the techniques described herein, among others. The memory 214 may store any information generated by various components of the autonomous vehicle (e.g., the perception module 202, the mapping/localization module 204, the vehicle control module 206, the processor 210, etc.). Further, the memory 214 may also store data received from various inputs associated with the autonomy system 250, such as perception data from the perception system.

As noted above, perception module 202 may receive input from the various sensors, such as camera system 220, LiDAR system 222, GNSS receiver 208, and/or IMU 224, (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates presence of the lane lines 116, 118, 120. Features perceived by the vehicle should generally track with one or more features stored in a digital map (e.g., in the localization module 204). Indeed, with respect to FIG. 1, the lane lines that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario, the vehicle approaches a new bend 128 in the road that is not stored in any of the digital maps on board the truck 102 because the lane lines 116, 118, 120 have shifted right from their original positions 122, 124, 126.

The system 150 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132*a*, 132*b* and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to detect and classify objects and/or features in real time image data captured by, for example, the camera system 220 and the LiDAR system 222. In some embodiments, the image classification function may be configured to detect and classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module that may be communicatively coupled to a repository of images or image data (e.g., visual data and/or point cloud data), and may additionally implement the functionality of the image classification function.

Non-limiting examples of the features detected from the images captured by the camera system 220 and/or point cloud data from the LiDAR system 222 include vehicles traveling in front of the truck 200 on the roadway. As used herein, the term "leading vehicle" can refer to any vehicle that is traveling in front of the truck 200 on the roadway. In some implementations, the leading vehicle can refer to any vehicle that is traveling in front of the truck 200 in the same lane as the truck 200. Using the image classification function and the computer vision function, for example, the system 250 may detect the presence of a leading vehicle traveling in front of the truck 200, which may be in or around the same lane as the truck 200. Additionally, using any of the information from the cameras, LiDAR, and/or radar, the system 250 may detect the relative distance between the truck 200 and the leading vehicle.

To detect the distance between the truck 200 and the leading vehicle, the system 250 may access distance information from the LiDAR point cloud. In some implementations, the system 250 may determine the apparent size (e.g., the amount of an image frame) that the leading vehicle occupies in the images captured by the camera system 220 to determine the distance between the truck 200 and the leading vehicle. The distance as determined based on the image data may also be a function of the class of vehicle, which may be determined via one or more image classification techniques (e.g., the execution of one or more classification neural networks or artificial intelligence models that are trained to classify a type or size of vehicle based on input image data.

In some implementations, the system 250 can determine the distance between the truck 200 and the leading vehicle based on radar data. In some implementations, the system 250 can execute one or more trained artificial intelligence models, which may be trained to receive any of the LiDAR points, the image data, and/or radar data as input and generate a corresponding distance value corresponding to the distance between the truck 200 and the leading vehicle. The distance between the truck 200 and the leading vehicle can be, for example, a distance from a front bumper of the truck 200 to a rear bumper of the leading vehicle.

The system 250 can monitor and determine respective speeds (e.g., velocities) of the truck 200 and the leading vehicle as the truck 200 and the leading vehicle travel on the roadway. To determine the speed or velocity of the truck 200, the system 250 may access internal state data stored in the memory 214, or may access one or more sensors (e.g., a speedometer, accelerometer, etc.) to determine the speed or velocity of the autonomous vehicle. The system 250 may determine the speed of the autonomous vehicle periodically, or in real-time or near real-time. The system 250 may utilize the near real-time speed to update distance bounds for adaptive cruise control according to the techniques described herein.

The system 250 can monitor and determine respective speeds (e.g., velocities) of the leading vehicle in real-time or near real-time, as well as predictions of respective future speeds and distances to the leading vehicle, to implement the adaptive cruise control techniques described herein. To determine the speed of the leading vehicle, the system 250 can utilize any data captured by the perception components of the system 250, such as camera data, LiDAR data, and/or radar data, as described herein. Determining the speed of the leading vehicle may include monitoring the relative distance of the leading vehicle to the truck 200 over time and calculating the speed of the leading vehicle based on the speed of the truck 200 and the change in distance between the leading vehicle and the truck 200. In some implementations, radar data may return the velocity of the leading vehicle. In some implementations, the system 250 can execute one or more trained artificial intelligence models, which may be trained to receive any of the LiDAR points, the image data, and/or radar data as input, and generate a corresponding speed or velocity value of the leading vehicle.

The system 250 can utilize the velocities of the truck 200 and the leading vehicle to determine a safe distance bound to maintain when implementing adaptive cruise control. The maximum distance bound may be determined according to a set of rules or mathematical functions that are used to calculate the maximum distance bound. In general, as the speed of the truck 200 increases relative to the speed of the leading vehicle, so does the safe distance needed. A graph showing different distance bounds for varying speeds of the leading vehicle and the truck 200 is depicted in FIG. 5. The distance bound can be provided to one or more components of the system 250, which may utilize the distance bound and other signals to automatically adjust the velocity of the truck 200. The distance bound can be updated in real-time or near real-time, as described herein.

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connecting to an external network during the mission. A centralized mapping system may be accessible via network 260 for updating the digital map(s) of the mapping/localization module 204.

The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it on board and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital features representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck. For example, once the systems on the truck have determined its location with respect to map features (e.g., intersections, road signs, lane lines, etc.) the truck may use the vehicle control module 206 and its associated systems to plan and execute maneuvers and/or routes with respect to the features of the environment. The vehicle control module 206 may make decisions about how the truck will move through the environment to get to its goal or destination as it completes its mission. The vehicle control module 206 may consume information from the perception module 202 and the maps/localization module 204 to know where it is relative to the surrounding environment and what other traffic actors are doing. The vehicle control module 206 may utilize the distance bound determined and updated according to the techniques described herein to change the speed of the truck 200 to maintain the distance between the truck 200 and a leading vehicle at the distance bound. The vehicle control module 206 may change the velocity of the truck 200 by accelerating or decelerating the truck 200 in real-time or near real-time to maintain the distance bound.

The vehicle control module 206 may be communicatively and operatively coupled to a plurality of vehicle operating systems and may execute one or more control signals and/or schemes to control operation of the one or more operating systems; for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck.

The steering system may be any combination of mechanisms configured to adjust the heading or direction of the truck. The brake system may be, for example, any combination of mechanisms configured to decelerate the truck (e.g., friction braking system, regenerative braking system, etc.). The vehicle control module 206 may be configured to avoid obstacles in the environment surrounding the truck and use one or more system inputs to identify, evaluate, and modify a vehicle trajectory. The vehicle control module 206 is depicted as a single module but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion.

In disclosed embodiments of a system for planning paths that will minimize the severity of a collision, the system 150, 250 collects perception data on objects that satisfy predetermined criteria for likelihood of collision with the ego vehicle. Such objects are sometimes referred to herein as target objects. Collected perception data on target objects may be used in collision analysis.

In an embodiment, road analysis module 230 executes an artificial intelligence model to predict one or more attributes of detected target objects. The artificial intelligence model may be configured to ingest data from at least one sensor of the autonomous vehicle and predict the attributes of the object. In an embodiment, the artificial intelligence module is configured to predict a plurality of predetermined attributes of each of a plurality of detected target objects relative to the autonomous vehicle. The predetermined attributes may include a relative velocity of the respective target object relative to the autonomous vehicle.

In an embodiment, the artificial intelligence model is a predictive machine learning model that may be continuously trained using updated data, e.g., relative velocity data, mass attribute data, and target objects classification data. In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

FIG. 3 shows an analysis and control module 300 of system 150, 250. The analysis and control module 300 includes velocity estimator 310, effective mass estimator 320, object visual parameters component 330, target object classification component 340, adaptive system 350, and longitudinal planner 360. These components of analysis and control module 300 may be either or both software-based components and hardware-based components.

Velocity estimator 310 may determine the relative velocity of target objects relative to the ego vehicle. Effective mass estimator 320 may estimate effective mass of target objects, for example, based on object visual parameters signals from object visual parameters component 330 and object classification signals from target object classification component 340. Object visual parameters component 330 may determine visual parameters of a target object such as size, shape, visual cues, and other visual features in response to visual sensor signals and generate an object visual parameters signal. Target object classification component 340 may determine a classification of a target object using information contained within the object visual parameters signal, which may be correlated to various objects and generate an object classification signal. For instance, the target object classification component 340 can determine whether the target object is a plastic traffic cone or an animal.

Target objects may include moving objects, such as other vehicles (e.g., leading vehicles), pedestrians, and cyclists in the proximal driving area. Target objects may include fixed objects such as obstacles; infrastructure objects such as rigid poles, guardrails or other traffic barriers, and parked cars. Fixed objects, also herein referred to herein as static objects and non-moving objects, can be infrastructure objects as well as temporarily static objects. The target object classification component 340 can utilize sensor data, as described in connection with FIGS. 1 and 2, to detect and classify leading vehicles.

Externally-facing sensors may provide the target object classification component 340 with data defining distances between the ego vehicle and target objects in the vicinity of the ego vehicle and with data defining direction of target objects from the ego vehicle. Such distances can be defined as distances from sensors, or sensors can process the data to generate distances from the center of mass or other portion of the ego vehicle. The externally-facing sensors may provide the target object classification component 340 with data relating to lanes of a multi-lane roadway upon which the ego vehicle is operating. The lane information can include indications of target objects (e.g., other vehicles, obstacles, etc.) within lanes. For example, the lane information may include data indicating whether a vehicle in front of the ego vehicle is within the same lane as the ego vehicle. If so, the target object classification component 340 may flag the vehicle in front of the ego vehicle as a leading vehicle.

In an embodiment, the system 150, 250 collects data relating to target objects within a predetermined region of interest (ROI) in proximity to the ego vehicle. Objects within the ROI satisfy predetermined criteria for likelihood of collision with the ego vehicle. The ROI may be defined with reference to parameters of the vehicle control module

206 in planning and executing maneuvers and/or routes with respect to the features of the environment.

In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes traveling in the same direction, lanes of opposing traffic, edges of a roadway, road junctions, and other road locations in collision proximity to the ego vehicle.

In an embodiment, the system 150, 250 can generate a high-definition (HD) map used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network. The system 150, 250 may use computer vision techniques, such as structure from motion, to process the data from onboard sensors and create a 3D model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the autonomous vehicle. The system 150, 250 may use real-time updates from the vehicle's onboard sensors to continuously update the HD map as the vehicle moves. This enables the vehicle to maintain an up-to-date representation of its surroundings and respond to changing conditions in real time.

The ability to generate an HD map may allow for safe and efficient operation of autonomous vehicles, as the map provides a detailed, up-to-date representation of the road network that the vehicle can use to navigate and make real-time decisions. Using the methods and systems discussed herein, a processor of the autonomous vehicle may generate an HD map, revise the HD map using various data (e.g., from identified road signs or received from a server), and/or display the map for a human driver.

The velocity estimator 310 may determine the velocity of target objects, such as leading vehicle(s) detected by the target object classification component 340. To determine the speed or velocity of the leading vehicle, the velocity estimator 310 can access any data captured or utilized by the target object classification component 340. Some non-limiting example data that may be utilized to determine the velocity of one or more leading vehicles can include camera data (e.g., images or video), LiDAR data, and/or radar data. Determining the speed of the leading vehicle may include monitoring the relative distance of the leading vehicle to the ego vehicle over time and calculating the speed of the leading vehicle based on the speed of the ego vehicle and the change in distance between the vehicles. In some implementations, the velocity estimator 310 may utilize radar data to determine the velocity of the leading vehicle.

In some implementations, the velocity estimator 310 can execute one or more trained artificial intelligence models, which may be trained to receive any of the LiDAR points, the image data, and/or radar data as input, and generate a corresponding speed or velocity value of the leading vehicle. The velocity estimator 310 may also determine the velocity of the ego vehicle using the techniques described herein (e.g., accessing sensor data from a speedometer, etc.). In some implementations, the leading vehicle may be another ego vehicle, or another type of autonomous vehicle with which the velocity estimator 310 may communicate (e.g., via one or more wireless communication protocols). In such implementations, the velocity estimator 310 may request the speed of the leading vehicle. In response to the request, the leading vehicle may access on-board sensor data (e.g., a speedometer) to determine the current speed of the leading vehicle and transmit the velocity data to the velocity estimator 310 in response. The velocity estimator 310 may perform similar operations upon receiving a request from another ego vehicle, so as to synchronize speed information across multiple autonomous vehicles in proximity to the ego vehicle.

The adaptive system 350 can determine distance bounds to maintain between the ego vehicle and a detected leading vehicle when implementing adaptive cruise control. The distance bound may be a maximum safe distance bound between an ego vehicle and the leading vehicle. For example, if the adaptive system 350 determines that the distance between the ego vehicle and a detected leading vehicle is greater than a safe distance for velocities of the ego vehicle and the leading vehicle, the adaptive system 350 can generate the distance bound as the maximum safe distance for the respective velocities of both vehicles and provide the distance bound to the longitudinal planner 360.

If the adaptive system 350 determines that the distance between the ego vehicle and a detected leading vehicle is less than a safe distance for velocities of the ego vehicle and the leading vehicle, the adaptive system 350 can calculate a preferred deceleration for the ego vehicle. The preferred deceleration may be a deceleration calculated as a function of the current speed of the ego vehicle and the distance between the ego vehicle and the leading vehicle. The preferred deceleration may be greater if the chance of a collision is greater (e.g., the speed of the ego vehicle is greater than the speed of the leading vehicle and the two vehicles are close). The preferred deceleration may be lesser if the chance of a collision is smaller (e.g., the speed of the ego vehicle is about equal to or less than the speed of the leading vehicle, or the two vehicles are close, etc.).

Once the preferred deceleration has been calculated, the adaptive system 350 can perform a time-based simulation to determine conditions of the ego vehicle and the leading vehicle based on their respective velocities and the distance between the two vehicles. The simulation may be performed in order to determine what the distance between vehicles will be after a predetermined amount of time (e.g., two seconds, five seconds, ten seconds, fifteen seconds, thirty seconds, etc.). The simulation may calculate the future distance between the ego vehicle and the leading vehicle after the predetermined amount of time based on the current velocities of the ego vehicle and the leading vehicle.

In some implementations, the adaptive system 350 may simulate an expected acceleration or deceleration to the velocity of the leading vehicle over time. The expected acceleration or deceleration may be determined based on the conditions of the roadway upon which the ego vehicle and leading vehicle are traveling. For example, the adaptive system 350 may simulate a deceleration if there is an obstacle (e.g., a static obstacle) detected ahead of the leading vehicle, or an upcoming decrease in the speed limit. In some implementations, the adaptive system 350 may simulate an acceleration if there is an upcoming increase in the speed limit.

Similar techniques may be utilized to predict the future position of the ego vehicle. If the adaptive system 350 has determined a preferred deceleration for the ego vehicle, the adaptive system 350 can additionally apply the preferred deceleration of the ego vehicle when simulating the future position of the ego vehicle. In some implementations, an assumption is made that both the ego vehicle and the leading vehicle will remain on the same roadway, and that the leading vehicle will not change lanes during the predetermined time period that is simulated. As such, the adaptive system 350 can simulate a future distance between the ego vehicle and the leading vehicle. The adaptive system 350 may calculate a new safe following distance at each time step of the simulation.

If the adaptive system 350 determines, based on the simulated distance and velocities, that the velocity of the ego vehicle started as greater than the velocity of the leading vehicle, but the simulated velocity has fallen below the velocity of the leading vehicle without violating safe distances, the adaptive system 350 determine a distance bound (e.g., the maximum safe distance bound, the distance bound at the end of the simulation, etc.) for the projected time with the projected safe following distance based on the predicted velocities of the ego vehicle and the leading vehicle. The adaptive system 350 may perform similar operations if the ego vehicle started as being slower than the leading vehicle, and the simulated following distance has remained greater than the safe following distance for the simulated velocities of both vehicles.

If the adaptive system 350 determines that the ego vehicle will not remain at a safe following distance within the time period set by the simulation, the adaptive system 350 can generate an intermediate bound by simulating the ego vehicle to decelerate at an determined rate that achieves a safe distance between the ego vehicle and the leading vehicle. The adaptive system 350 can determine the intermediate bound by determining a minimum safe distance between the ego vehicle and the lead vehicle. The minimum safe distance may be determined as a function of the predicted velocities of the ego vehicle and the leading vehicle. Some example minimum safe following distances are shown in the graph of FIG. 5. The adaptive system 350 may generate one or more bounds for each vehicle detected on the roadway in front of the ego vehicle and can select the most restrictive bound to provide to the longitudinal planner 360.

The longitudinal planner 360 may plan longitudinal motion as a desired trajectory of the ego vehicle. The desired trajectory may include, for example, both a desired path and speed. The longitudinal planner 360 may consider kinematic, static and dynamic constraints of the vehicle, as well as all moving and static obstacles. The longitudinal planner 360 may consider, for example, inputs from the various behavioral modules described herein when considering kinematic, static, and dynamic constraints. One example constraint can be the distance bounds determined by the adaptive system 350, as described herein. The longitudinal planner 360 can determine whether and the degree to which to slow down, speed up, or maintain speed by balancing one or more autonomous driving goals, such as minimizing jerk, optimizing for target velocity, minimizing changes in speed, and staying within bounds for all constraints it receives from various behavioral components of the ego vehicle, in addition to the bounds received from the adaptive system 350.

The longitudinal planner 360 may plan motion of the vehicle over any planning horizon. The longitudinal planner 360 may concatenate multiple layers of trajectories to produce a plan with one or more near to distant planning horizons and search for multiple candidate trajectories within the constraints provided by the behavioral modules, for example. The longitudinal planner 360 may interact with one another and the other various modules of the system in a hierarchical architecture or a parallel architecture and may comprise one or more dedicated sensors. For example, the longitudinal planner 360 may execute a cost-based planning function to control the speed of the ego vehicle.

FIG. 4 is a flow diagram of an example method 400 of determining distance bounds for adaptive cruise control, according to an embodiment. The steps of the method 400 of FIG. 4 may be executed, for example, by an autonomous vehicle system, including the system 150, 250, or the analysis and control module 300, according to some embodiments. The method 400 shown in FIG. 4 comprises execution steps 410-440. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 400 of FIG. 4 is described as being performed by an autonomous vehicle system (e.g., the system 150, the system 250, the analysis and control module 300, etc.). However, in some embodiments, one or more of the steps may be performed by different processor(s) or any other computing device. For instance, one or more of the steps may be performed via a cloud-based service or another processor in communication with the processor of the autonomous vehicle and/or its autonomy system. Although the steps are shown in FIG. 4 as having a particular order, it is intended that the steps may be performed in any order. It is also intended that some of these steps may be optional.

At operation 410, an autonomous vehicle system of an autonomous vehicle can identify one or more leading vehicles on the roadway that are traveling in front of the autonomous vehicle. The second vehicle may be a second autonomous vehicle. To do so, the autonomous vehicle can execute one or more machine learning or artificial intelligence models or algorithms on sensor data captured by various sensors of the autonomous vehicle system. For example, images captured by a camera system and/or point cloud data from a LiDAR system may be utilized to detect vehicles traveling in front of the autonomous vehicle on the roadway.

In some implementations, the autonomous vehicle system may use radar sensors to detect the presence of one or more leading vehicles. For example, radar sensors in communication with the autonomous vehicle system can emit radio waves that bounce off nearby vehicles, which the autonomous vehicle system can receive and analyze to determine the distance, speed, and location of one or more leading vehicles. Similar approaches may be utilized to detect the presence, speed, and distance to leading vehicles based on LiDAR points captured by LiDAR sensors of the autonomous vehicle.

Image analysis techniques, such as image classification and object detection, may be utilized to identify one or more leading vehicles, as described herein. For example, the autonomous vehicle system may execute an object detection model (e.g., a machine learning or artificial intelligence model) using images of the roadway in front of the autonomous vehicle as input to identify one or more leading vehicles on the roadway. Additionally, the autonomous vehicle systems can determine and track the distance between the autonomous vehicle and the one or more leading vehicles as described herein (e.g., using LiDAR, radar, image analysis, or combinations thereof). The leading vehicles can be any vehicles that are in front of and traveling along the roadway in the same direction as the autonomous vehicle.

At operation 420, the autonomous vehicle system can determine a speed of the one or more leading vehicles while the one or more leading vehicles travel along the roadway. To determine the speed or velocity of each leading vehicle detected in step 410, the autonomous vehicle system can utilize the sensor data captured by the various sensors mounted on the autonomous vehicle, including LiDAR sensors, radar sensors, and image sensors (e.g., image or video). Determining the speed of each leading vehicle may include monitoring the relative distance of the leading vehicle to the ego vehicle over time and calculating the speed of the leading vehicle based on the speed of the ego vehicle and the change in distance between vehicles. In some implementations, the autonomous vehicle system may utilize radar data to determine the velocity of the leading vehicle. In some implementations, the autonomous vehicle system can execute one or more trained artificial intelligence models, which may be trained to receive any of the LiDAR points, the image data, and/or radar data as input, and generate a corresponding speed or velocity value of each leading vehicle, as described herein.

In some implementations, one or more of the detected leading vehicles may themselves be autonomous vehicles. In such implementations, the autonomous vehicle system may request the speed of the leading vehicle via one or more wireless communication protocols. In response to the request, the leading vehicle may access on-board sensor data (e.g., a speedometer) to determine the current speed of the leading vehicle and transmit the velocity data to the autonomous vehicle system in response. The speed of each leading vehicle may be determined periodically, or in real-time or near real-time.

At operation 430, the autonomous vehicle system can generate a distance bound between the autonomous vehicle and each leading vehicle based on the speed of the second vehicle and a speed of the autonomous vehicle. The speed of the autonomous vehicle may be determined by accessing one or more sensors of the autonomous vehicle (e.g., a speedometer, accelerometer, etc.) to determine the speed or velocity of the autonomous vehicle. The autonomous vehicle system may determine the speed of the autonomous vehicle periodically, or in real-time or near real-time.

In some implementations, as described herein, the distance bound may be a maximum safe distance bound between the autonomous vehicle and each leading vehicle. For example, if the autonomous vehicle system determines that the distance between the autonomous vehicle and a detected leading vehicle is greater than a safe distance for velocities of the ego vehicle and the leading vehicle, the autonomous vehicle system can determine the distance bound as the maximum safe distance for the respective velocities of both vehicles and proceed to step 440 of the method 400.

If the autonomous vehicle system determines that the distance between the autonomous vehicle and a detected leading vehicle is less than a safe distance for velocities of the autonomous vehicle and the leading vehicle, the autonomous vehicle system can calculate a preferred deceleration for the autonomous vehicle, as described herein. The preferred deceleration may be a deceleration calculated as a function of the current speed of the autonomous vehicle and the distance between the autonomous vehicle and the leading vehicle. Once the preferred deceleration has been calculated, the autonomous vehicle system can perform a time-based simulation to determine conditions of the autonomous vehicle and each leading vehicle.

The simulation may be performed in order to determine what the distance between vehicles will be after a predetermined amount of time (e.g., two seconds, five seconds, ten seconds, fifteen seconds, thirty seconds, etc.). The simulation may be used to predict the future distance between the autonomous vehicle and each leading vehicle based on the current velocities of the autonomous vehicle and each leading vehicle.

In some implementations, the autonomous vehicle system may simulate an expected acceleration or deceleration to the velocity of the leading vehicle over time. The expected acceleration or deceleration may be determined based on the conditions of the roadway upon which the autonomous vehicle and leading vehicle are traveling. For example, the autonomous vehicle system may simulate a deceleration if there is an obstacle (e.g., a static obstacle) detected ahead of the leading vehicle, one or more upcoming turns or intersections on the roadway, or an upcoming decrease in the speed limit. In some implementations, the autonomous vehicle system may simulate an acceleration if there is an upcoming increase in the speed limit. The expected velocity and position of the autonomous vehicle can also be estimated using similar techniques (e.g., predicted via simulation/projection), such that the autonomous vehicle system can calculate the estimated distance between the autonomous vehicle and each leading vehicle for each time step of the simulation.

If the autonomous vehicle system determines, based on the simulated distance and velocities, that the velocity of the autonomous vehicle started as greater than the velocity of the leading vehicle, but the simulated velocity has fallen below the velocity of the leading vehicle without a collision, the autonomous vehicle system determine a distance bound (e.g., the maximum safe distance bound, the distance bound at the end of the simulation, etc.) for the projected time with the projected safe following distance based on the predicted velocities of the autonomous vehicle and the leading vehicle. The autonomous vehicle system may perform similar operations if the autonomous vehicle started as being slower than the leading vehicle, and the simulated following distance has exceeded the safe following distance for the simulated velocities of both vehicles.

If the autonomous vehicle system determines that the autonomous vehicle will not arrive at a safe following distance to one or more leading vehicles within the time period set by the simulation, the autonomous vehicle system can generate an intermediate bound that causes the autonomous vehicle to decelerate at a determined rate to enforce a safe distance between the autonomous vehicle and the leading vehicle. The autonomous vehicle system can determine the intermediate bound by determining a minimum safe distance between the autonomous vehicle and the lead vehicle. The minimum safe distance may be determined as a function of the predicted velocities of the autonomous vehicle and the leading vehicle.

The autonomous vehicle system can dynamically increase or decrease the distance bound for a leading vehicle upon detecting a change in the speed of the leading vehicle or the autonomous vehicle. For example, upon detecting a change in the velocity of the leading vehicle or the autonomous vehicle, the autonomous vehicle system may execute another simulation using the updated values for the autonomous vehicle velocity or one or more leading vehicles velocities to generate new distance bounds. The autonomous vehicle system can execute the simulations periodically, or in response to detecting a change in velocity of the autonomous vehicle or one or more leading vehicles that exceeds a predetermined threshold.

In some implementations, the autonomous vehicle system can communicate with one or more leading vehicles to determine a safe following distance. For example, the one or more leading vehicles may transmit signals that indicate upcoming changes to the velocity of the leading vehicle (e.g., commands that will be executed to change the velocity of the leading vehicle). Based on these indications, the autonomous vehicle system can calculate the maximum safe following distance as a function of the expected change in velocity and a predicted (e.g., simulated) velocity of the autonomous vehicle.

The autonomous vehicle system can calculate respective distance bounds for each leading vehicle detected on the roadway in front of the autonomous vehicle. For example, the autonomous vehicle may calculate distance bounds for other autonomous vehicles in adjacent lanes to the lane in which the autonomous vehicle is traveling. Each distance bound may be generated as described herein. Upon generating each distance bound, the autonomous vehicle system can select the most restrictive bound to control the autonomous vehicle to implement adaptive cruise control. For example, the autonomous vehicle system can set the distance bound to be the maximum safe following distance for each point in time.

At operation 440, the autonomous vehicle system can control the speed of the autonomous vehicle to implement adaptive cruise control according to the distance bound. To do so, the autonomous vehicle system can automatically adjust the speed of the autonomous vehicle to maintain the distance bound generated in step 430 between the autonomous vehicle and the one or more leading vehicles. The distance bound may be a minimum or maximum safe following distance. To do so, the autonomous vehicle system can implement a cost-based technique to determine the speed of the autonomous vehicle based on constraints set by other components of the autonomous vehicle. The constraints may include a maximum velocity constraint, the distance bound determined in step 430, a maximum distance bound to the closest leading vehicle, or a minimum velocity constraint, among others.

The autonomous vehicle system can dynamically increase, decrease, or otherwise maintain the speed of the autonomous vehicle to achieve safe following distances according to the distance bound. For example, the autonomous vehicle system may dynamically decrease the speed of the autonomous vehicle upon detecting that the speed of the closest leading vehicle has decreased (e.g., slowed based on an updated distance bound). The autonomous vehicle may also utilize additional factors or signals to concurrently achieve other autonomous driving goals, such as minimizing jerk, optimizing for target velocity, minimizing changes in speed, and staying within bounds for all received constraints, as described herein.

FIG. 5 depicts an example graph diagram showing following distances determined for an autonomous vehicle in response to different lead vehicle velocity and autonomous vehicle velocity, according to an embodiment. As shown, the optimal following distance (e.g., a distance bound) to a lead vehicle is a function of both the velocity of the lead vehicle and the ego vehicle. In this example, the optimal following distance decreases as the velocity of the lead vehicle increases relative to the velocity of the ego vehicle. If the velocity of the lead vehicle is significantly greater than the velocity of the ego vehicle, the optimal following distance becomes close to or about equal to zero. If the velocity of the lead vehicle is less than the velocity of the ego vehicle, the optimal following distance increases. Due to the increased time required to stop the ego vehicle, the optimal following distance increases as the speeds of the ego vehicle and the leading vehicle increase.

FIG. 6 depicts an example graph diagram showing projections of different bounds determined when the autonomous vehicle is at a distance from the safe following distance, according to an embodiment. As shown, the graph includes a consolidated distance bound that is calculated according to the techniques described herein based on multiple distance bounds determined for different leading vehicles. The distance bounds for each vehicle are labeled in the graph as "ACC_bound_for_ob_1," "ACC_bound_for_ob_2," and "ACC_bound_for_ob_3," although the lines for "ACC_bound_for_ob_2" and ACC_bound_for_ob_3" are omitted from the graph for visual clarity. As shown, the "ACC_bound_for_ob_1" bound is the most restrictive and was selected as the consolidated bound to utilize for adaptive cruise control. The "optimized" line may correspond to the actual distance and velocity profile that the longitudinal planner (e.g., the longitudinal planner 360) has chosen to execute.

As shown, the bound may be calculated for each time step, and the bound may be dynamic as the velocities of each vehicle changes. In this example, the velocities of both vehicles are constant over time. In this example, the distance bound is projected to increase as time increases due to an expected (e.g., simulated) positive speed. The distance bound may be created relative to the predicted trajectory of the lead vehicle, which means the distance bound may have a slope defined based on the velocity of the lead vehicle.

FIG. 7 depicts an example graph diagram showing projections of different bounds determined when the autonomous vehicle is to slow down to maintain a safe following distance, according to an embodiment. As shown, the graph is similar to the graph shown in FIG. 6, and includes a consolidated distance bound that is calculated according to the techniques described herein based on multiple distance bounds determined for different leading vehicles. The distance bounds for each vehicle are labeled in the graph as "ACC_bound_for_ob_1," "ACC_bound_for_ob_2," and "ACC_bound_for_ob_3," although the lines for "ACC_bound_for_ob_2" and "ACC_bound_for_ob_3" are omitted from the graph for visual clarity. As shown, the "ACC_bound_for_ob_1" bound is the most restrictive and was selected as the consolidated bound to utilize for adaptive cruise control. The "optimized" line may correspond to the actual distance and velocity profile that the longitudinal planner (e.g., the longitudinal planner 360) has chosen to execute.

As shown, the bound may be calculated for each time step, and the bound may be dynamic as the velocity of each vehicle changes. In this example, the consolidated bound decreases because the current following distance is not as large as the safe following distance, and the ego vehicle must slow down to achieve a larger following distance at some point in the future. This is shown by the negative slope in the line representing the consolidated bound in the graph. After slowing down, the velocity of the ego vehicle can remain constant at the safe following distance.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:
at least one processor of an autonomous vehicle traveling on a roadway, the at least one processor configured to:
identify a second vehicle on the roadway that is traveling in front of the autonomous vehicle;
determine a speed of the second vehicle while the second vehicle travels along the roadway;
generate a distance bound between the autonomous vehicle and the second vehicle based on the speed of the second vehicle and a speed of the autonomous vehicle, the distance bound defining a maximum safe following distance between the second vehicle and the autonomous vehicle;
determine the autonomous vehicle will not arrive at the maximum safe following distance within a predetermined time period;
generate an intermediate distance bound between the autonomous vehicle and the second vehicle based on the speed of the second vehicle and the speed of the autonomous vehicle, the intermediate distance bound defining a minimum safe following distance between the second vehicle and the autonomous vehicle; and
control the speed of the autonomous vehicle to implement adaptive cruise control by causing the autonomous vehicle to decelerate to enforce the intermediate distance bound.

2. The system of claim 1, wherein the at least one processor is configured to execute an object detection model to identify the second vehicle on the roadway.

3. The system of claim 1, wherein the at least one processor is configured to determine the speed of the second vehicle based on sensor data captured by one or more sensors mounted on the autonomous vehicle.

4. The system of claim 1, wherein the at least one processor is configured to dynamically increase the distance bound upon detecting a change in the speed of the second vehicle or the speed of the autonomous vehicle.

5. The system of claim 1, wherein the at least one processor is configured to dynamically adjust the distance bound upon detecting a change in the speed of the second vehicle or the speed of the autonomous vehicle.

6. The system of claim 1, wherein the at least one processor is configured to determine the distance bound based on a first predicted position of the autonomous vehicle and a second predicted position of the second vehicle.

7. The system of claim 1, wherein the at least one processor is configured to determine a decreased speed for the autonomous vehicle based on the speed of the autonomous vehicle and the speed of the second vehicle.

8. The system of claim 7, wherein the at least one processor is configured to cause the autonomous vehicle to slow to the decreased speed based on the intermediate distance bound between the autonomous vehicle and the second vehicle.

9. The system of claim 1, wherein the second vehicle is a second autonomous vehicle, and wherein the at least one processor is further configured to transmit a signal to at least one second processor of the second autonomous vehicle to determine a maximum distance bound between the autonomous vehicle and the second autonomous vehicle.

10. The system of claim 1, wherein the at least one processor is further configured to determine a consolidated distance bound based on the distance bound and a second distance bound determined based on a third vehicle.

11. A method, comprising:

identifying, by at least one processor of an autonomous vehicle traveling on a roadway, a second vehicle on the roadway that is traveling in front of the autonomous vehicle;

determining, by the at least one processor, a speed of the second vehicle while the second vehicle travels along the roadway;

generating, by the at least one processor, a distance bound between the autonomous vehicle and the second vehicle based on the speed of the second vehicle and a speed of the autonomous vehicle, the distance bound defining a maximum safe following distance between the second vehicle and the autonomous vehicle;

determining, by the at least one processor, the autonomous vehicle will not arrive at the maximum safe following distance within a predetermined time period;

generating, by the at least one processor, an intermediate distance bound between the autonomous vehicle and the second vehicle based on the speed of the second vehicle and the speed of the autonomous vehicle, the intermediate distance bound defining a minimum safe following distance between the second vehicle and the autonomous vehicle; and controlling, by the at least one processor, the speed of the autonomous vehicle to implement adaptive cruise control by causing the autonomous vehicle to decelerate to enforce the intermediate distance bound.

12. The method of claim 11, further comprising executing, by the at least one processor, an object detection model to identify the second vehicle on the roadway.

13. The method of claim 11, further comprising determining, by the at least one processor, the speed of the second vehicle based on sensor data captured by one or more sensors mounted on the autonomous vehicle.

14. The method of claim 11, further comprising dynamically increasing, by the at least one processor, the distance bound upon detecting a change in the speed of the second vehicle or the speed of the autonomous vehicle.

15. The method of claim 11, further comprising dynamically adjusting, by the at least one processor, the distance bound upon detecting a change in the speed of the second vehicle or the speed of the autonomous vehicle.

16. The method of claim 11, further comprising determining, by the at least one processor, the distance bound based on a first predicted position of the autonomous vehicle and a second predicted position of the second vehicle.

17. The method of claim 11, further comprising determining, by the at least one processor, a decreased speed for the autonomous vehicle based on the speed of the autonomous vehicle and the speed of the second vehicle.

18. The method of claim 17, further comprising causing, by the at least one processor, the autonomous vehicle to slow to the decreased speed based on the intermediate distance bound between the autonomous vehicle and the second vehicle.

19. The method of claim 11, wherein the second vehicle is a second autonomous vehicle, and wherein the method further comprises transmitting, by the at least one processor, a signal to at least one second processor of the second autonomous vehicle to determine a maximum distance bound between the autonomous vehicle and the second autonomous vehicle.

20. The method of claim 11, further comprising determining, by the at least one processor, a consolidated distance bound based on the distance bound and a second distance bound determined based on a third vehicle.

\* \* \* \* \*